June 27, 1939. R. C. ZEIDLER 2,163,971
CLUTCH CONSTRUCTION
Filed Nov. 2, 1937
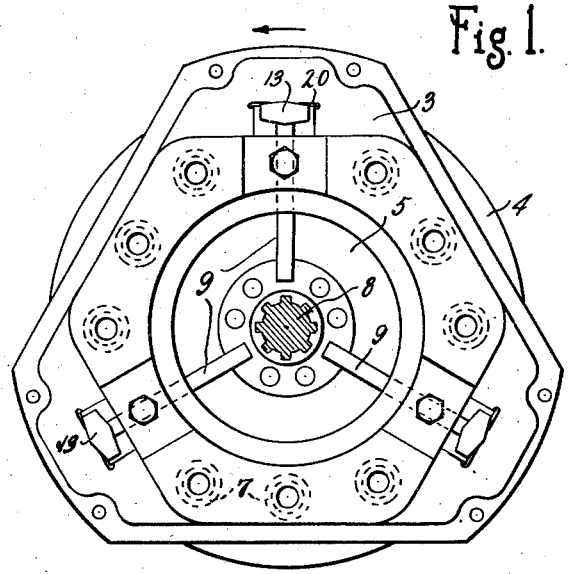
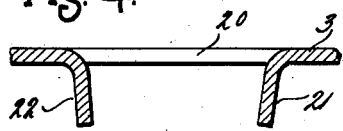
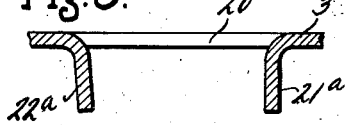
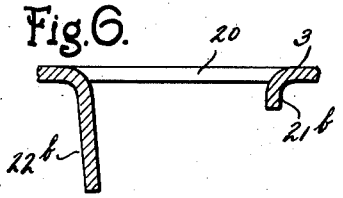
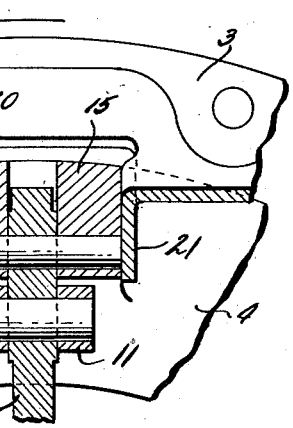
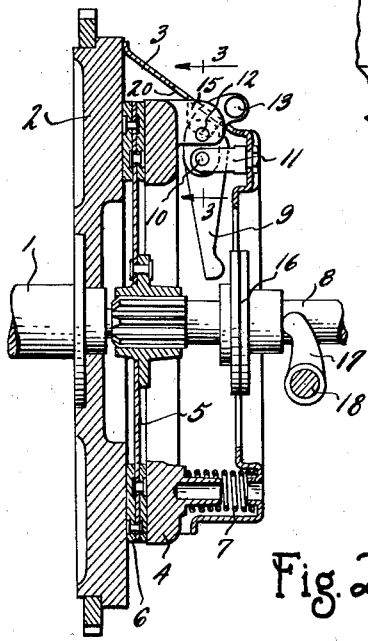
INVENTOR.
Reinhold C. Zeidler
BY
Barnes, Kisselle, Laughlin & Raisch
ATTORNEY.S Patented June 27, 1939

2,163,971

UNITED STATES PATENT OFFICE 2,163,971

CLUTCH CONSTRUCTION

Reinhold C. Zeidler, Detroit, Mich., assignor to Borg-Warner Corporation, Chicago, Ill., a corporation of Illinois Application November 2, 1937, Serial No. 172,470

8 Claims. (Cl. 192—68)

This invention relates to a clutch construction, and it has to do particularly with a clutch where a member, such as a driving member, is driven through the means of lugs or projections slidably fitted in apertures of another member, such as a cover plate.

More particularly, the invention is directed to a clutch construction where a cover plate, which is usually sheet metal, is provided with apertures for the reception of lugs or projections of an axially shiftable pressure plate. The invention aims to provide an improved construction which will provide a non-rattling driving connection between the cover plate and pressure plate, and which provides improved contacting surfaces, one of which imparts driving action from the cover plate to the pressure plate.

In some automotive vehicles, due to certain engine conditions, torsional disturbances or vibrations are set up in the crank-shaft system. If there is any play, or, in other words, any limited relative movement between the pressure plate and cover plate, objectionable noises may arise due to the lugs or projections shifting back and forth in the apertures and striking opposite side walls thereof. It is the object of this invention to overcome this objection and to eliminate the possibility of the development of any such noise in the clutch even though the torsional disturbances or vibrations are set up in the crank-shaft system of the engine. At the same time the connection is such that relative axial movement is permitted for clutch engagement and disengagement.

One form of construction for carrying out the invention is illustrated in the accompanying drawing. In the drawing:

Fig. 1 is a rear elevational view of a clutch construction in which the invention may be incorporated.

Fig. 2 is a sectional view taken through the clutch construction illustrated in Fig. 1.

Fig. 3 is an enlarged cross sectional view taken substantially on line 3—3 of Fig. 2.

Fig. 4 is an enlarged sectional view illustrating in an exaggerated manner one form of structure.

Fig. 5 is a similar enlarged cross sectional view showing a different form of construction.

Fig. 6 is a similar enlarged cross sectional view illustrating a third form of construction embodying the invention.

The general features of the clutch shown herein are, of course, subject to variation, but the particular clutch shown has been selected for the purpose of illustrating the invention. The crank-shaft of an engine is illustrated at 1 having attached thereto a flywheel 2, one side of which constitutes a friction face of a clutch driving member, and attached to the flywheel is a cover plate 3. A pressure plate 4 constitutes a second driving member, and a driven disc 5 which may have clutch facing material 6 attached thereto is arranged to be packed between the pressure plate and flywheel. For this purpose, a number of springs may be used, the springs being shown at 7.

The driven disc is splined to a driven shaft 8. A plurality of clutch release levers are illustrated at 9 and each is fulcrumed at 10 on brackets 11 carried by the cover plate, and pivotally connected as at 12 to projections on the pressure plate 4. In the form shown each lever has an unbalanced centrifugal weight 13 which serves to increase the packing pressure of the clutch due to rotation, but so far as the present invention is concerned, this unbalanced centrifugal weight arrangement may or may not be used.

The clutch is actuated for release and engagement through the means of a clutch throwout bearing 16 which is axially shiftable through the means of the usual yoke 17 mounted upon a rock shaft 18 which is rocked by a clutch pedal or other instrumentality after any known or desired manner. The projections on the pressure plate may be bifurcated as illustrated in Fig. 3, the projections being generally illustrated at 15, and the levers 9 may lie in between the two parts of the bifurcated construction.

The cover plate is formed with apertures 20, one for each projection on the pressure plate, there being three projections shown in the form illustrated and three clutch release levers. The apertures are formed by shearing out some of the metal and leaving other portions of the metal to form ears which are fashioned to extend inwardly of the cover plate and so arranged as to embrace the projections 15. In Fig. 4 one ear is illustrated at 21 while another is at 22. Now it will be noted that the ears as shown in Fig. 4 are not parallel but converge toward each other in a direction extending away from the plane of the adjacent portion of the cover plate. Both ears are inclined in this form. This converging relationship is exaggerated in Fig. 4 for purposes of clearance. It has been found that a converging relationship which will decrease the width by about .008 of an inch from the plane of the cover plate is satisfactory. When the projection 15 is introduced in the aperture, the ears are flexed and caused to substantially parallel the sides of the projection 15. This is illustrated in Fig. 3.

It will be observed, therefore, that the driving projections on the pressure plate are engaged with some spring tension; therefore, when torsional disturbances or vibrations in the engine crank-shaft system are communicated to the cover plate, and which may tend to cause the cover plate and pressure plate to oscillate relative to each other on their axes, this oscillation is substantially prevented, or in any event, dampened out and noises prevented by the spring action of the ears. For example, it might be pointed out that where the aperture 20 is merely provided by shearing the metal all around, a sheared surface contacts with the driving projection. The sheared surface does not offer a very large surface and repeated oscillations may cause some wear resulting in an increase in looseness. Relative oscillation between the cover plate and pressure plate in this event may cause the projections to rattle in the apertures and create objectionable noises. Moreover, the presence of the ears provides a larger driving surface for transmitting rotary driving actions from the cover plate to the pressure plate. However, the ears are not to engage the pressure plate strongly enough to interfere with axial shift of the pressure plate in its movement for engaging and disengaging the clutch.

Another form of construction which the invention may take is illustrated in an exaggerated manner in Fig. 5. In this form the ear 21a is fashioned so as to engage the projection 15 without flexing action. In other words, its contacting surface is preformed so as to lie substantially flush against the projection without flexing action. This ear is on the driving side. The ear 22a engages the projection 15 on what may be termed the "coast" side. An internal combustion engine, of course, rotates in one direction only, as for example, counter-clockwise as Fig. 1 is viewed, this being in the direction of the arrow. The cover plate drives the pressure plate through the driving side, which is at the side of the ears 21a; the ears 22a are on the coast side and do not transmit this driving torque. Of course, relative oscillation at times will put a load upon the ears on the coast side, but this is not the driving force for driving the vehicle or other load. In this form the entire spring action is taken up by the ears on the coast side.

The cover plate is usually made of hot rolled steel which can be properly called mild steel, and therefore does not have the qualities of spring steel. In order to increase the length of the tapered ear, which may be necessary in some cases, due to the mildness of the cover plate stock, or due to any other desired reason, the structure shown in Fig. 6 may be employed. The ear 21b on the driving side is made relatively short as shown and is so fashioned as to not provide any spring action. The ear 22b on the coast side is made longer and inclined as illustrated to provide the tension engagement with the projection on the pressure plate. This structure may be used with the same amount of ear stock as is used where the ears are of the same length, as illustrated in Figs. 4 and 5. In production, however, it appears at the present time, to be preferable to form the ears in the same manner as illustrated in Fig. 4, as this simplifies the die construction. Furthermore, where the levers are mounted upon a clevis pin, as illustrated at 12 in Fig. 3, the ears serve to hold the clevis pin in position, thus eliminating any additional parts to perform this function. By making the ear 22b relatively long, enough length is obtained to get the requisite spring action, even though the cover plate is made of mild steel and not designed particularly to have spring characteristics.

I claim:

1. In a clutch, the combination of a driven member, driving members between which the driven member is to be packed in driving relation, one driving member being axially shiftable for clutch operation and having driving lugs projecting therefrom, the other driving member including a part having apertures therein for receiving the lugs in driving and sliding relationship, and ears on said one driving member, one forming one side of each of said apertures and converging toward each other and arranged to engage the lugs with tension for restraining relative oscillation between said driving members.

2. In a clutch, the combination of a driven member, driving members between which the driven member is to be packed in driving relation, one driving member being axially shiftable for clutch operation and having driving lugs projecting therefrom, the other driving member including a part having apertures therein for receiving the lugs in driving and sliding relationship, each aperture being defined in part by ears projecting from the apertured driving member in converging relationship and forming opposite sides of the apertures for engaging the lugs with tension and with the stock forming the ears stressed, whereby to restrain relative oscillation between said driving members.

3. In a clutch, the combination of a driven member, driving members between which the driven member is to be packed in driving relation, one driving member being axially shiftable for clutch operation and having driving lugs projecting therefrom, the other driving member including a part having apertures therein for receiving the lugs in driving and sliding relationship, each aperture being defined in part by ears extending from the apertured members with the ears arranged to engage opposite sides of the lugs, said ears converging toward each other in a direction away from the aperture, and the distance between their extreme ends being less than the dimension across the lugs, whereby the ears are stressed when the lugs are introduced therebetween to engage the lugs with tension.

4. In a clutch, the combination of a driven member, driving members between which the driven member is to be packed in driving relation, one driving member being axially shiftable for clutch operation and having driving lugs projecting therefrom, the other driving member including a part having apertures therein for receiving the lugs in driving and sliding relationship, each aperture being defined in part by ears extending from the apertured member with the ears arranged to engage opposite sides of the lug, the ears which engage the lugs on the driving side lying substantially normal to a plane through the adjacent part of the apertured driving member, and the ears for engaging the lugs on the coast side being inclined toward the ears on the driving side and adapted to be stressed upon introduction of the lugs between the ears to engage the lugs with tension.

5. In a clutch, the combination of a sheet metal cover plate formed with apertures therein, an axially shiftable pressure plate having lugs fitted in the apertures, the metal of the cover plate being fashioned with projecting ears on the driving and coast sides of the apertures and between which the lugs are introduced, said ears converging toward each other in a direction toward their free ends and arranged to engage the lugs with tension.

6. In a clutch, the combination of a sheet metal cover plate formed with apertures therein, an axially shiftable pressure plate having lugs fitted in the apertures, opposed ears at each aperture formed of integral metal fashioned to extend laterally from the aperture, for engaging the lug on opposite sides, said ears extending angularly relative to a position normal to a plane taken through the aperture and arranged to be flexed upon the introduction of a lug to engage the same with tension.

7. In a clutch, the combination of a sheet metal cover plate formed with apertures therein, an axially shiftable pressure plate having lugs fitted in the apertures, opposed ears at each aperture formed of integral metal fashioned to extend laterally from the aperture, one for engaging the lug on the driving side and one for engaging the lug on the coast side, the ear on the driving side lying substantially normal to the plane of the aperture and the ear on the coast side being inclined toward the ear on the driving side and adapted to be stressed upon introduction of the lug therebetween to engage the lug with tension.

8. In a clutch, the combination of a sheet metal cover plate formed with apertures therein, an axially shiftable pressure plate having lugs fitted in the apertures, opposed ears at each aperture formed of integral metal fashioned to extend laterally from the aperture, one for engaging the lug on the driving side and one for engaging the lug on the coast side, the ear on the driving side lying substantially normal to the plane of the aperture and the ear on the coast side being inclined toward the ear on the driving side and adapted to be stressed upon introduction of the lug therebetween to engage the lug with tension the ear on the driving side being relatively short and the ear on the coast side being relatively long, whereby to obtain a requisite tension in said inclined ear.

REINHOLD C. ZEIDLER.